United States Patent [19]

Paton et al.

[11] Patent Number: 4,564,740

[45] Date of Patent: Jan. 14, 1986

[54] METHOD OF GENERATING PLASMA IN A PLASMA-ARC TORCH AND AN ARRANGEMENT FOR EFFECTING SAME

[76] Inventors: Boris E. Paton, ulitsa Chkalova, 41-a, kv. 26; Gary A. Melnik, ulitsa Prazhskaya, 3, kv. 169; Jury V. Latash, ulitsa Artema, 55, kv. 23; Oleg S. Zabarilo, ulitsa Zodchikh, 62-a, kv. 100; Vasily A. Tkalich, ulitsa Saratovskaya, 6, kv. 2; Sergei E. Gedzun, ulitsa Malinovskogo, 25, kv. 176; Ljudmila G. Odintsova, ulitsa Gorkogo, 62, kv. 3, all of Kiev; Gavriil D. Agarkov, ulitsa Engelsa, 12, kv. 16, V.Salda; Vladislav V. Tetjukhin, ulitsa Spartakovskaya, 20, kv. 27; Nikolai A. Tulin, ploschad Nogina, 2, kv. 5, both of Moscow; Gennady G. Vedernikov, ulitsa Zhukova, 8, kv. 21, Chelyabinsk; Nikolai P. Pozdeev, ulitsa B.Khmelnitskogo, 25, kv. 109, Chelyabinsk; Valery D. Azbukin, ulitsa Stalevarov, 46-a, kv. 60, Chelyabinsk; Georgy N. Okorokov, ulitsa Valovaya, 42/44, kv. 22, Moscow; Nikolai V. Letnikov, ulitsa 8 Marta, 55, kv. 2, Elektrostal Moskovskoi oblasti, all of U.S.S.R.

[21] Appl. No.: 565,852

[22] Filed: Dec. 30, 1983

Related U.S. Application Data

[63] Continuation of Ser. No. 1,862, Jan. 8, 1979, abandoned.

[51] Int. Cl.[4] ................................................ B23K 9/00

[52] U.S. Cl. ......... 219/121 PM; 219/121 PP:121 PN

[58] Field of Search ....... 219/121 P, 121 PY, 121 PP, 219/121 PM, 121 PR, 121 PN, 121 PQ, 74, 75, 76, 16; 313/231.31, 231.41, 231.51

[56] References Cited

U.S. PATENT DOCUMENTS

| | | | |
|---|---|---|---|
| 3,832,513 | 8/1974 | Klasson | 219/121 P |
| 3,949,188 | 4/1976 | Tateno | 219/121 P |
| 4,125,754 | 11/1978 | Wasserman et al. | 219/121 P |
| 4,133,987 | 1/1979 | Lakomsky | 219/121 P |

FOREIGN PATENT DOCUMENTS

| | | | |
|---|---|---|---|
| 2140967 | 2/1973 | Fed. Rep. of Germany | 219/121 P |
| 0565789 | 9/1977 | U.S.S.R. | 219/121 P |

*Primary Examiner*—M. H. Paschall

*Attorney, Agent, or Firm*—Fleit, Jacobson, Cohn & Price

[57] ABSTRACT

The proposed method relates to the ionization of plasma-generating gas in a pilot arc before being supplied to the electrode region, thus generating charges in this electrode region, the charges promoting dispersion of an arc spot. For this purpose, an electrode assembly is provided within the plasma-arc torch, which electrode assembly comprises a hollow tungsten electrode and a solid electrode of the same metal, the solid electrode being radially spaced from the hollow electrode. Both electrodes are put in an electric power circuit, whereby an arc is initiated between the electrodes when switching on the electric circuit, plasma being generated in the arc, which plasma serves to start the main arc and provides for dispersion of the arc spot over the surface of the hollow electrode. This decreases the current density in the arc spots and, hence, minimizes electrode erosion. Such an arrangement provides for the nozzle to be electrically insulated from the electrodes and, therefore, protected against harmful damage.

6 Claims, 5 Drawing Figures

METHOD OF GENERATING PLASMA IN A PLASMA-ARC TORCH AND AN ARRANGEMENT FOR EFFECTING SAME

This application is a continuation of application Ser. No. 001,862, filed Jan. 8, 1979 now abandoned.

BACKGROUND OF THE INVENTION

The present invention relates to electrometallurgical processes wherein the concentrated thermal energy of an electric arc is used for heating metal in melting furnaces. More specifically, it relates to a method of generating plasma in a plasma-arc torch and an arrangement in a plasma-arc torch used for heating metal.

For the purposes of the present invention by a plasma-arc torch is meant an apparatus adapted to generate a jet of "cold" plasma.

Plasma-arc torches generally comprise a water-cooled torch body having a nozzle, and a centrally positioned electrode made from a refractory metal, such as tungsten or molybdenum, with emissive additives. In transferred arc plasma-arc torches a plasma-generating gas, such as hydrogen, nitrogen, argon, helium and so on, turns to plasma in an arc discharge sustained between a refractory cathode and a workpiece serving as the anode.

In non-transferred plasma-arc torches plasma is generated between a cathode and an anode arranged as a constructed annular nozzle.

DESCRIPTION OF THE PRIOR ART

Specific erosion of the electrode is a feature characteristic of the plasma-arc torch life.

The plasma-arc torch power is primarily determined by the arc current. As the arc current increases, the electrode is heated more intensively due to bombardment thereof by electrons and ions. The arc self-pinching increases with the current, and a sharp increase in the current density and heat fluxes across the effective surface, particularly arc spots, is accordingly noted, which causes the temperature of the electrode to rise and the erosion thereof to intensify.

The heat inflow per unit cross-sectional area of the electrode is so intensive that the cathode material at its surface layer is likely to melt down, boil up and spatter, thus contaminating the melt.

Consequently, due to the short electrode life, plasma-arc torches for heavy currents are difficult to design. This problem is approached in a number of ways.

To operate a plasma-arc torch with a required arc current, the cross-sectional area of the electrodes is known to be increased directly with the arc current (cf. U.S. Pat. No. 3,130,292).

When selecting the operating current for electrodes having enlarged cross-sectional areas, it is assumed that the electrode current density should not exceed the critical value depending on the emissive capacity of the electrode material and its thermal properties.

However, if the electrode current density is in excess of the critical value, the electrode is subject to a very rapid destruction.

A major disadvantage of such plasma-arc torches is the intensive erosion of the electrode at heavy currents due to arc self-pinching, causing a sharp rise in the current density across the arc spots.

Lower currents do not improve the performance characteristics of plasma-arc torches either for at low currents arcs are unstable particularly those sustained between large-diameter electrodes, while the current density across arc spots is rather high.

Known in the art are a method of generating plasma in a plasma-arc torch and an arrangement in a plasma-arc torch for effecting same, as disclosed in U.S. Pat. No. 3,147,329, wherein a D.C. pilot arc is used.

The prior art method consists in that, in a stream of plasma-generating gas, first the pilot arc and then the main one are ignited. Both arcs are struck in the electrode region where the gas is supplied cold in a conventional way.

The cold gas provides for stable orientation of the main arc column, yet it adversely affects the current-carrying capacity of the electrode region and the current flow through the latter.

As the current across the main arc increases, the transient arc spots become evident. To increase the current across the main arc, the cross-sectional area of the electrode should be enlarged, the low-current pilot arc failing to minimize the electrode erosion.

The prior art arrangement comprises a water-cooled torch body having a nozzle, and a hollow electrode made from a refractory metal positioned within the torch body and having a central passage.

In operation, between the hollow electrode and the nozzle there is sustained a D.C. arc intended to stabilize the main arc. Plasma-generating gas is supplied into the spacing between the hollow electrode and the nozzle, as well as into the central passage in the hollow electrode. Such a combination is intended to reduce the electrode erosion in the case of currents above 4,000 A.

Yet, such an arrangement of the plasma-arc torch does not provide an adequate solution of the electrode erosion problem, though it does allow the arc column to be directionally stabilized to a certain degree.

Due to the cold gas being heated and ionized in the electrode region by the pilot arc sustained between the hollow electrode and the nozzle, there occurs a double arcing phenomenon, and arc spots appear across the nozzle surface, thus causing a severe damage to the nozzle.

Double arcing accompanied by erratic displacement of the arc spots over the surface of the electrode, the nozzle and the heated material, causes instability and spontaneous drifting of the main arc in respect to the axis of the nozzle passage.

The cold gas supplied to the central passage in the hollow electrode affects the current-conducting capacity of the electrode region and causes instability in the arc current flow through the region.

This leads to constriction of the arc column and the arc spots over the electrode surface, giving rise to excessive erosion thereof.

A major part of the charged particles results from electrons escaping from the high-temperature electrode, which is another cause of excessive damage to the electrode.

The above considerations account for limited applications of the plasma-arc torch of the above construction.

SUMMARY OF THE INVENTION

It is an object of the present invention to provide a method of generating plasma in a plasma-arc torch and an arrangement for carrying out this method, wherein electrode erosion is decreased.

A further object of the present invention is to provide a method of generating plasma in a plasma-arc torch and an arrangement which will permit eliminating nozzle erosion.

Still another object of the present invention is to provide a method of generating plasma in a plasma-arc torch and an arrangement with an improved plasma column formation.

These and other objects are accomplished by a method of generating plasma in a plasma-arc torch consisting in that, first a pilot arc and then the main one are ignited in the flow of a plasma-generating gas, wherein, according to the invention, the gas, prior to being supplied to the electrode region of the main arc, is heated in the pilot arc to a temperature sufficient for ionization thereof, the current of the pilot arc being adjusted to a value at least 0.05 times that of the current of the main arc.

Such a sequence of steps as well as operating conditions are helpful in selecting optimum variables to generate plasma upstream of the electrode region.

Such plasma provides for an electrode region conductivity sufficient for passage of the main arc current. As a consequence, the main arc current may be adjusted over a wide range with the same electrode cross-sectional area. The gas being first ionized and only then supplied to the electrode region of the main arc, ensures in this region such a number of charged particles which is indispensable for passage of the main arc current therethrough and compensation for the space charge in proximity to the effective surface of the electrode.

As a result, the electrode drop, hence the energy transmitted to the electrode, are decreased, that is pinching and migration of the arc spots are eliminated, the electrode temperature decreases and, consequently, electrode erosion is minimized.

Also, the ionized gas supplied to the electrode region provides for a quiet main arc and increases the directional stability of the plasma-arc column, thereby mitigating the erosion of the nozzle.

The objects of this invention are also accomplished by providing an arrangement in a plasma-arc torch for carrying out the above method, which comprises a water-cooled torch body having a nozzle, and a hollow electrode made from a refractory metal, and positioned within the torch body in a radially spaced relationship therewith to define an annular gas passage therebetween, and having a central passage, wherein, according to the invention, an auxiliary electrode of a material similar to that of the hollow electrode is positioned in a radially spaced relationship to define an annular gas passage, the hollow electrode and the auxiliary electrode being put in an electric circuit whereby a pilot arc is ignited between the hollow electrode and the auxiliary electrode when the electric circuit is energized.

Such a construction permits minimizing the erosion of the hollow electrode and the nozzle, as well as establishing a highly stable main arc.

This is accomplished that, as the ionized gas in the pilot arc passes to the electrode region of the main arc which is ignited between the hollow electrode and the workpiece, it provides for a number of charged particles indispensable for passage of the main arc current and compensation for the space charge in proximity to the effective surface of the electrode.

As a result, the voltage drop in the electrode region decreases, hence the energy transmitted to the hollow electrode, current density on the surface of the hollow electrode and the temperature thereof are reduced and, consequently, the electrode erosion is minimized. In addition, the main arc is quiet and the plasma column is stable in respect to the center line of the nozzle passage.

In this case, the nozzle is actually neutral both at start-up of the plasma-arc torch and during operation, since the pilot arc is sustained between the hollow and auxiliary electrodes. Consequently, cold gas which is supplied into the spacing between the hollow electrode and the nozzle is not ionized by the pilot arc, which in fact completely eliminates double arcing and subsequent intensive destruction of the nozzle. Hence, the nozzle life is extended several times.

To produce a pilot arc of an optimum length and effectively heat the supplied gas to a desired temperature and degree of ionization it is preferable that the arcing tip of the hollow electrode and that of the auxiliary electrode be recessed with respect to that of the hollow electrode by 0.1 to 0.5 of the outside diameter of the hollow electrode.

It is to be understood by those skilled in the art that an increase in the current value of the main arc entails an increase in the diameter of the hollow electrode.

The pilot arc current which is essential for obtaining a specified temperature of heating and degree of ionization of the supplied gas is to be increased with the main arc current. Accordingly, to maintain the required value of the pilot arc current density across the auxiliary electrode, the diameter of the auxiliary electrode must be increased. Preferably, the diameter of the auxiliary electrode should be at least O.I times the diameter of the hollow electrode. Such an electrode exhibits maximum stability over the entire operating range of the plasma-arc torch.

For stabler formation of the electrode region the central passage of the hollow electrode should preferably be provided with an expanded portion having a length of 0.1 to 0.2 outside diameters of the hollow electrode from the arcing tip thereof and a diameter, near the surface of the arcing tip, ranging from 2 to 5 diameters of the remaining portion of the central passage.

The expanded portion may be shaped as a truncated cone or a cylinder.

Such an embodiment provides adequate conditions for forming the electrode region, dispersion thereof throughout the expanded portion of the central passage and, consequently, a decrease in the current density on the electrode surface. The gas breakaway area is located within the expanded portion, at the sharp bends of the expanded portion profile. These phenomena in their totality greatly assist in minimizing the arc pinching in the electrode region, keeping the arc from wandering to the edge of the electrode tip or displacement onto the electrode side surface.

All these factors contribute to minimum electrode erosion, adequate formation of the plasma column and elimination of double-arcing.

BRIEF DESCRIPTION OF THE DRAWINGS

Further objects and advantages of the present invention will become more apparent from the following description of preferred embodiments thereof, taken in conjunction with the accompanying drawings, wherein.

DETAILED DESCRIPTION OF THE INVENTION

Figure 1:
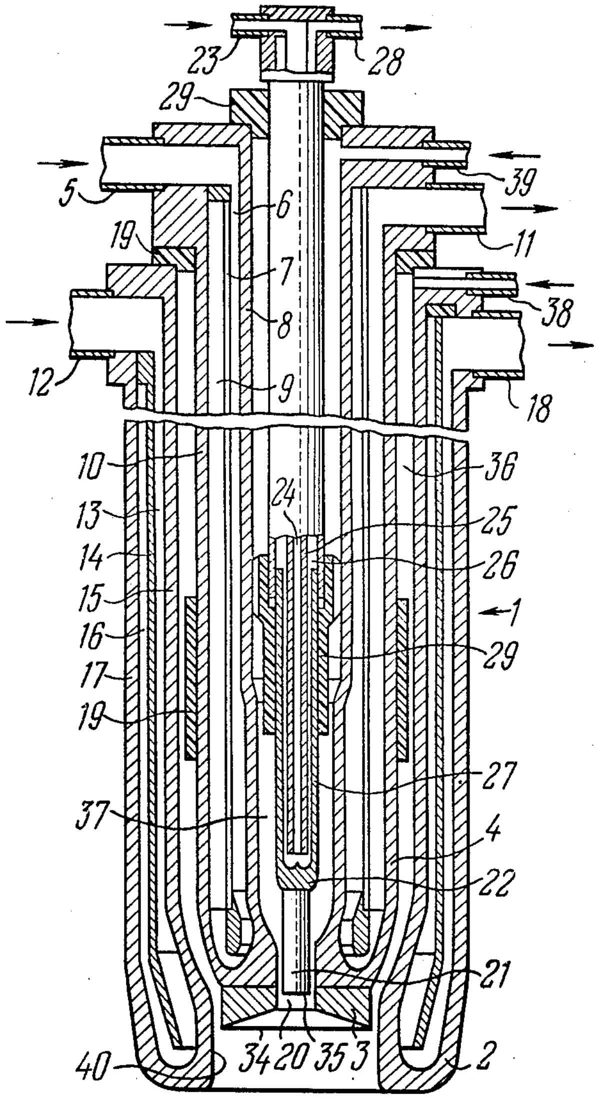
FIG. 1 is a longitudinal section view of a plasma-arc torch comprising an arrangement embodying the concept of the invention.

Referring to FIG. 1, there is shown a plasma-arc torch merely for illustrating the concept of the invention, which comprises a torch body 1 having a nozzle 2, and a hollow electrode 3 or cathode for D.C. operation, positioned within the torch body 1 and preferably made from refractory metals such as tungsten, tantalum, niobium and molybdenum containing minor amounts of emissive additives such as thoria and yttria. The electrode 3 is supported by an electrode holder 4. In order to remove excess heat from the electrode 3 and prevent the latter from melting, the electrode holder, made from a thermally conducting material such as copper, is cooled by a liquid coolant such as water. The cooling fluid enters through an inlet 5 into an annular passage 6 which is defined by a cooling tube 7 and an inner wall 8 of the electrode holder 4, and leaves through an annular passage 9 which is defined by the cooling tube 7, and an outer wall 10 of the electrode holder 4 and then through an outlet 11.

The nozzle 2 is water-cooled similarly to the electrode holder 4, the water flowing from an inlet 12 into an annular passage 13 defined by a cooling tube 14 and an inner wall 15 of the torch body 1, the inner wall 15 terminating in the nozzle 2, into an annular passage 16 defined by the cooling tube 14 and an outer wall 17 of the torch body 1, the outer wall 17 terminating in the nozzle 2, and then through an outlet 18.

The torch body 1 and the nozzle 2 are electrically insulated from the electrode holder 4 which supports the hollow electrode 3 by means of insulators 19.

According to the invention, an auxiliary electrode 21 of a material similar to that of the hollow electrode 3 is supported by an electrode holder 22 within a central passage 20. The auxiliary electrode 21 and the central passage 20 with their surfaces define an annular passage for delivery of gas. The auxiliary electrode 21 is also water-cooled by water flowing from an inlet 23 into a central passage 24 of a cooling tube 25, and out through an annular passage 26 defined by the cooling tube 25 and the wall 27 of the electrode holder 22 and then through an outlet 28.

The hollow electrode 3 and the auxiliary electrode 21 are electrically insulated from each other through insulators 29.

According to the invention, the hollow electrode 3 and the auxiliary electrode 22 are connected the power supply circuit. This can be easily seen in FIG. 2 which is a schematic of the proposed plasma-arc torch and the power supply circuit for the torch, which circuit may comprise power supply 30 connected to the hollow electrode 3 and the auxiliary electrode 21 for energizing it either with direct or alternating current, when the circuit of the power supply 30 is closed, e.g. with the aid of an oscillator 31, a pilot arc is initiated between said electrodes. The main arc sustained between the hollow electrode 3 and a metal 32 is energized from a source 33 of either D.C. or A.C. power.

Figures 2, 3, 4, 5:
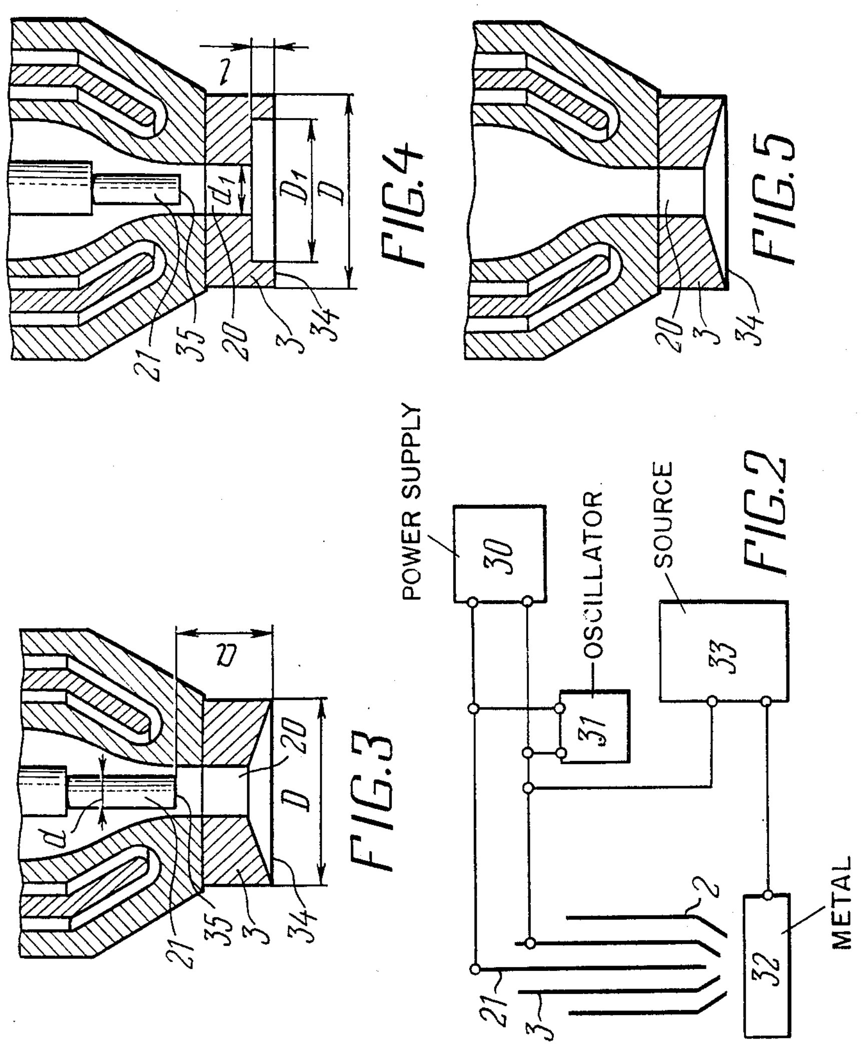
FIG. 2 is a schematic circuit diagram illustrating the plasma-arc torch of the invention, connected to an electric power supply.
FIG. 3 shows an electrode assembly of the plasma-arc torch on an enlarged scale.
FIG. 4 shows an embodiment of the invention, wherein the hollow electrode has an expanded portion of the central passage.
FIG. 5 shows a further embodiment of the invention, wherein the hollow electrode has an expanded portion of the central passage.

Turning now to FIG. 3, the auxiliary electrode 21 is shown recessed into the hollow electrode 3 so that the axial distance between the arcing tips 34 and 35 of the hollow and auxiliary electrodes, respectively is 0.1 to 0.5 times the external diameter D of the hollow electrode, the diameter d of the auxiliary electrode being at least 0.1 of the diameter D of the hollow electrode.

The plasma-arc torch has passages for delivering inert gas into the arc region, such as an annular passage 36 and an annular passage 37 whereinto gas is fed through inlets 38 and 39, respectively, as can be readily seen in FIG. 1.

The plasma-arc torch of the present invention may have other embodiments, each exhibiting features conducive to a lower current density on the electrode surface and elimination of arc spot wandering.

The central passage 20 (FIG. 4) in the hollow electrode 3 between the arcing tip 34 thereof and the arcing tip 35 of the auxiliary electrode 21 is provided with an expanded portion having length 1 equal to 0.1 to 0.2 outside diameter D of the hollow electrode 3, from the arcing tip 34 as shown in FIG. 4. The diameter $D_1$ of this expanded portion at the surface of the arcing tip 34 equals 2 to 5 diameters $d_1$ of the remainder portion of the central passage 20.

The expanded portion of the central passage 20 may be shaped as a cylinder or a truncated cone, as shown in FIGS. 4 and 5 respectively.

The above described plasma-arc torch, which is intended to carry out the method of the invention, may be used in melting and refining metals. Such a torch may have power supply from any suitable A.C. or D.C. source to feed the torch with appropriate power.

In operation, the plasma-arc torch is energized from the power supply 30. Prior to initiation of the arc, gas through the inlets 38 and 39 is supplied to the annular passages 36 and 37. Then the power supply 30 and oscillator 31 are switched on and with the aid of the oscillator 31 a pilot arc is struck between the hollow electrode 3 and the auxiliary electrode 21. The gas is fed through the annular passage 37, flowing around the auxiliary electrode 21, and further through the central passage 20 to the pilot arc region and out from this central passage into the nozzle passage 40.

The current value across the pilot arc is adjusted to at least 0.05 of that across the main arc. The gas heated and ionized in the pilot arc emerges from the central passage 20 of the hollow electrode 3 forming a conducting zone between the hollow electrode and the metal work, which offers good conditions for igniting and maintaining the main arc.

Then the power supply 30 is switched on to energize the main arc which is ignited between the hollow electrode 3 and the metal 32 due to the presence of the gas ionized in the pilot arc.

By adjusting the current across the pilot arc above the set point of 0.05 of the current across the main arc it is possible to increase or decrease the current across the main arc while varying the pilot arc current in proportion to that across the main arc.

The following examples of tests to verify the method and apparatus of the present invention illustrate its advantages over the prior art.

EXAMPLE 1

A plasma-arc torch similar to that shown in FIG. 1 was used for metal heating and melting.

An auxiliary tungsten electrode 6 mm in diameter containing 3% of yttria was positioned within a water-cooled hollow tungsten electrode having a central passage 10 mm in diameter. The hollow electrode was 15 mm in length and 1600 mm$^2$ in cross-sectional area. The tip of the auxiliary electrode was recessed to a depth of 8 mm relative to that of the hollow electrode. The hollow electrode with the auxiliary electrode mounted therein was positioned within a water-cooled torch body having a water-cooled copper nozzle 50 mm in diameter. The tip of the hollow electrode was recessed to a depth of 25 mm with respect to the nozzle outlet. Argon at 8 l/min was supplied into the central passage of the hollow electrode. The gas passed around the hollow electrode and out through the central passage, and, at the same time, the gas was supplied at 120 l/min between the hollow electrode and the torch body having the nozzle. A pilot arc of 300 amperes D.C. and 18 volts was ignited between the auxiliary electrode or cathode and the hollow electrode or anode. This pilot arc provided the starting means and charged particle source in the electrode region for a 3000 amperes A.C. and 80 volts main arc ignited between the hollow electrode and the metal to be melted.

The copper nozzle was at all times electricaly insulated from the electrodes. After 3 hours of operation, the arc was extinguished. Examination of the electrodes showed that there was substantially no destruction or erosion of the electrodes, whereas the nozzle was not damaged at all.

EXAMPLE 2

A plasma-arc torch similar to that shown in FIG. 1 was used for metal heating and melting.

An auxiliary tungsten electrode 8 mm in diameter containing 3% of yttria was positioned with a water-cooled hollow tungsten electrode having a central passage 10 mm in diameter. The hollow electrode was 18 mm in length and 1800 mm$^2$ in cross-sectional area. The tip of the auxiliary electrode was recessed to a depth of 12 mm relative to that of the hollow electrode. The hollow electrode with the auxiliary electrode mounted therein was positioned within a water-cooled torch body having a water-cooled copper nozzle 55 mm in diameter. The tip of the hollow electrode was recessed to a depth of 30 mm with respect to the nozzle outlet. Argon at 10 l/min was supplied into the central passage of the hollow electrode. The gas passed around the hollow electrode and out through the central passage, and, at the same time, the gas was supplied at 140 l/min between the hollow electrode and the torch body having the nozzle. A pilot arc of 300 amperes D.C. and 18 volts was ignited between the auxiliary electrodes or cathode, and the hollow electrode or anode.

This pilot arc provided the starting means and charged particles source in the electrode region for a 5000 amperes A.C. and 87 volts main arc ignited between the hollow electrode and the metal melt. The copper nozzle was at all times electrically insulated from the electrodes. The main arc was stable. The plasma-arc torch was in operation for 50 hours. After the plasma-arc torch had been switched off, the surfaces of the electrodes and the nozzle were examined visually. No apparent destruction or erosion was detected. The nozzle surface was found to be undamaged.

EXAMPLE 3

A plasma-arc torch similar to that in Examples 1 and 2 was used for metal metling.

An auxiliary tungsten electrode 12 mm in diameter containing 3% of yttria was positioned within a tungsten water-cooled hollow electrode having a central passage 12 mm in diameter. Said hollow electrode was 23 mm in length and 2000 mm$^2$ in cross-sectional area. The tip of the auxiliary electrode was recessed to a depth of 25 mm relative to that of the hollow electrode. Said hollow electrode with the auxiliary electrode mounted therein was positioned within a water-cooled torch body having a water-cooled copper nozzle 62 mm in diameter. The tip of the hollow electrode was recessed to a depth of 40 mm relative to the nozzle outlet. Argon at 40 l/min was supplied into the central passage of the hollow electrode.

The gas passed around the hollow electrode and out through the central passage, and, at the same time, the gas was supplied at 200 l/min between the hollow electrode and the torch body with the nozzle. A pilot arc of 600 amperes D.C. and 18 volts was ignited between the auxiliary electrode or cathode and the hollow electrode or anode, whereupon the main arc of 6000 amperes A.C. and 100 volts was ignited. The copper nozzle was at all times electrically insulated from the electrodes. After 50 hours of operation the arc was extinguished. Examination of the electrodes showed that the surfaces thereof were slightly damaged. The nozzle surface had no traces of damage.

EXAMPLE 4

A plasma-arc torch similar to that shown in FIG. 1 but comprising a hollow electrode as shown in FIG. 4 was used for metal melting.

An auxiliary tungsten electrode 8 mm in diameter, containing 3% yttria was positioned within a tungsten water-cooled hollow electrode having a 10 mm dia. central passage. The hollow electrode having outer diameter of 50 mm had an expanded portion 30 mm in diameter and 8 mm long. The hollow electrode was 18 mm in length and 1800 mm$^2$ in cross-sectional area. The tip of the auxiliary electrode was recessed to a depth of 12 mm relative to the tip of the hollow electrode. Said hollow electrode with the auxiliary electrode mounted therein was positioned within a torch body having a water-cooled copper nozzle 55 mm in diameter. The tip of the hollow electrode was recessed to a depth of 30 mm relative to the nozzle outlet. Argon at 18 l/min was supplied into the central passage of the hollow electrode. The gas passed around the auxiliary electrode and out through the central passage. The gas was supplied at 150 l/min between the hollow electrode and the nozzle. A pilot arc of 240 amperes D.C. and 18 volts was ignited between the auxiliary electrode serving as a cathode, and the hollow electrode or anode, whereupon the main arc of 4000 amperes A.C. and 83 volts was ignited. The copper nozzle was at all times electrically insulated from the electrodes. After 3 hours of operation the arc was extinguished. Examination of the electrodes showed that the surfaces thereof were slightly damaged. The nozzle had no traces of damaging influence of the arc upon the surface thereof.

EXAMPLE 5

A plasma-arc torch similar to that shown in FIG. 1 but having a hollow electrode as shown in FIG. 4 was used for metal melting.

An auxiliary tungsten electrode 6 mm in diameter, containing 3% of yttria was positioned within a tungsten water-cooled hollow electrode having a central passage 10 mm in diameter. Said hollow electrode having an outer diameter of 45 mm had an expanded portion 20 mm in diameter and 5 mm long. The hollow electrode was 15 mm in length and 1600 mm$^2$ in cross-sectional area. The tip of the auxiliary electrode was recessed to a depth of 8 mm relative to that of the hollow electrode. The hollow electrode with the auxiliary electrode mounted therein was positioned within a torch body having a water-cooled copper nozzle 50 mm in diameter. The tip of the hollow electrode was recessed to a depth of 25 mm relative to the nozzle outlet. Argon at 8 l/min was supplied into the central passage of the hollow electrode. The gas passed around the auxiliary electrode and out through the central passage. The gas was supplied at 120 l/min between the hollow electrode and the nozzle. A pilot arc of 300 amperes D.C. and 18 volts was ignited between the auxiliary electrode serving as a cathode, and the hollow electrode or anode, whereupon the main arc of 3000 amperes A.C. and 80 volts was ignited. The copper nozzle was at all times electrically insulated from the electrodes. After 3 hours of operation the arc was extinguished. Examination of the electrodes showed that the surfaces thereof were slightly damaged. The nozzle had no traces of damaging influence of the arc upon the surface thereof.

EXAMPLE 6

A plasma-arc torch similar to that shown in FIG. 1 but comprising a hollow electrode as shown in FIG. 4 was used for metal melting.

An auxiliary tungsten electrode 12 mm in diameter containing 3% yttria was positioned within a tungsten water-cooled hollow electrode having a central passage 16 mm in diameter. The hollow electrode having an outer diameter of 60 mm had an expanded portion 55 mm in diameter and 11 mm long. The hollow electrode was 23 mm in length and 2000 mm$^2$ in cross-sectional area. The tip of the auxiliary electrode was recessed to a depth of 25 mm relative to that of the hollow electrode. The hollow electrode with the auxiliary electrode mounted therein was positioned within a torch body having a water-cooled copper nozzle 62 mm in diameter. The tip of the hollow electrode was recessed to a depth of 40 mm from the nozzle outlet. Argon at 40 l/min was supplied into the central passage of the hollow electrode. The gas passed around the auxiliary electrode and out through the central passage. The gas was suppllied at 200 l/min between the hollow electrode and the nozzle. A pilot arc of 300–500 amperes D.C. and 18 volts was ignited between the auxiliary electrode serving as a cathode, and the hollow electrode or anode, thereupon the main arc of 5000 amperes A.C. and 87 volts was ignited. The copper nozzle was at all times electrically insulated from the electrodes. After 3 hours of operation the arc was extinguished. Examination of the electrodes showed that the surfaces thereof were slightly damaged. The nozzle had no traces of damaging influence of the arc upon the surface thereof.

EXAMPLE 7

A plasma-arc torch similar to that shown in FIG. 1 but comprising a hollow electrode as shown in FIG. 4 was used for metal melting.

An auxiliary tungsten electrode 6 mm in diameter, containing 3% of an emissive additive of yttria was positioned within a tungsten water-cooled hollow electrode having a central passage 10 mm in diameter. The hollow electrode having an outer diameter of 45 mm had an expanded portion 20 mm in diameter at the tip and 5 mm long. The expanded portion was shaped as a truncated right circular cone in which two generating lines, if extended until they intersect, make a maximum possible angle between them, the apex angle of the cone, equal to 100°. The hollow electrode was 15 mm in length and 1600 mm$^2$ in cross-sectional area. The tip of the auxiliary electrode was recessed to a depth of 8 mm relative to that of the hollow electrode. The hollow electrode with the auxiliary electrode mounted therein was positioned within a torch body having a water-cooled copper nozzle 50 mm in diameter. The tip of the hollow electrode was recessed to a depth of 25 mm relative to the nozzle outlet. Argon at 20 l/min was supplied into the central passage of the hollow electrode. The gas passed around the auxiliary electrode and out through the central passage. The gas was supplied at 150 l/min. between the hollow electrode and the nozzle. A pilot arc of 120–200 amperes D.C. and 18 volts was ignited between the auxiliary electrode serving as a cathode, and the hollow electrode or anode whereupon the main arc of 2000 amperes A.C. and 78 volts was ignited. The copper nozzle was at all times electrically insulated from the electrodes. After 3 hours of operation the arc was extinguished. Examination of the electrodes showed that the surfaces thereof were slightly damaged. The nozzle had no signs of erosion.

EXAMPLE 8

A plasma-arc torch similar to that shown in FIG. 1 but comprising a hollow electrode as shown in FIG. 5, was used for melting metal.

An auxiliary tungsten electrode 8 mm in diameter, containing 3% of yttria was positioned within a tungsten water-cooled hollow electrode having a central passage 12 mm in diameter. The hollow electrode having an outer diameter of 50 mm had an expanded portion 30 mm in diameter at the tip and 8 mm long. Said expanded portion was shaped as a truncated right circular cone in which two generating lines, if extended until they intersect, make a maximum possible angle between them, the apex angle of the cone, equal to 140°. The hollow electrode was 18 mm in length and 1800 mm$^2$ in cross-sectional area. The tip of the auxiliary electrode was recessed to a depth of 12 mm relative to that of the hollow electrode.

The hollow electrode with the auxiliary electrode mounted therein was positioned within a torch body having a water-cooled copper nozzle 55 mm in diameter. The tip of the hollow electrode was recessed to a depth of 30 mm from the nozzle outlet. Argon at 25 l/min was supplied into the central passage of the hollow electrode. The gas passed around the auxiliary electrode and out through the central passage. The gas at was supplied 180 l/min between the hollow electrode and the nozzle. A pilot arc of 60 amperes D.C. and 18 volts was ignited between the auxiliary electrode serving as a cathode, and the hollow electrode or anode, whereupon the main arc of 1000 amperes A.C. and 75 volts was ignited. The copper nozzle was at all times electrically insulated from the electrodes. After 3 hours of operation the arc was extinguished. Examination of the electrodes showed that the surfaces thereof were slightly damaged. The nozzle had no signs of erosion.

EXAMPLE 9

A plasma-arc torch similar to that shown in FIG. 1 but comprising a hollow electrode as shown in FIG. 5, was used for metal melting.

An auxiliary tungsten electrode 12 mm in diameter, containing 3% of yttria was positioned within a tungsten water-cooled hollow electrode having a central passage 16 mm in diameter. Said hollow electrode having an outer diameter of 60 mm had an expanded portion 55 mm in diameter at the tip and 11 mm long. Said expanded portion was shaped as a truncated right circular cone in which two generating lines, if extended until they intersect, make a maximum possible angle between them, the apex angle of the cone, equal to 160°. The hollow electrode was a 23 mm in length and 2000 $mm^2$ in cross-sectional area. The tip of the auxiliary electrode was recessed to a depth of 25 mm relative to that of the hollow electrode. The hollow electrode with the auxiliary electrode mounted therein was positioned within a torch body having a water-cooled copper nozzle 62 mm in diameter. The tip of the hollow electrode was recessed to a depth of 40 mm relative to the nozzle outlet. Argon at 40 l/min was supplied into the central passage of the hollow electrode. The gas passed around the auxiliary electrode and out through the central passage. The gas was supplied at 200 l/min between the hollow electrode and the nozzle. A pilot arc of 300 to 600 amperes D.C. and 18 volts was ignited between the auxiliary electrode serving as a cathode, and the hollow electrode or anode whereupon the main arc of 6000 amperes A.C. and 100 volts was ignited. The copper nozzle was at all times electrically insulated from the electrodes. After 3 hours of operation the arc was extinguished. Examination of the electrodes showed that the surfaces thereof were slightly damaged. The nozzle had no signs of erosion.

The above examples illustrate that the method according to the present invention allows the power of a plasma-arc torch having the same electrode to be varied within a wide range. Meanwhile, electrode erosion, as compared to the prior art methods, is decreased with a proper arc stability being assured.

The decrease in electrode erosion provides for a significant increase in life and reliability of operation of the plasma-arc torch, as well as in the quality of operation due to elimination of contamination of treated metals.

Apart from the above described forward polarity D.C. power supply to the pilot arc, the proposed device may be operated at reversed polarity D.C. as well as A.C. power supply when energizing both the pilot and main arcs.

While certain embodiments of the present invention have been disclosed and described, it is to be understood that certain modifications and substitutions could be made by those skilled in the art without departing from the spirit and scope of the invention.

What is claimed is:

1. A plasma-arc torch for use with a work piece, said torch comprising:

an elongated water-cooled torch body having a nozzle portion;

a refractory metal hollow electrode having a central passage therein and positioned in said torch body in a radially spaced relationship thereto for forming a first annular gas passage between said electrode and said torch body;

an auxiliary electrode made from a metal similar to that of said hollow electrode, and positioned within the central passage of said hollow electrode in a radially spaced relationship thereto for forming a second annular gas passage between said auxiliary electrode and said hollow electrode, said second gas passage separate and distinct from said first gas passage, said auxiliary electrode terminating in an arcing tip that is positioned within and surrounded by said hollow electrode;

said hollow electrode and said auxiliary electrode being connected in an electric circuit for igniting a pilot arc therebetween when switching on the current, said pilot arc being ignited between the arcing tip of said auxiliary electrode and an interior portion of said hollow electrode that surrounds said arcing tip, said hollow electrode simultaneously igniting a main arc between said hollow electrode and the work piece due to the presence of a gas being ionized in said pilot arc, said pilot arc being ignited upstream of and being continuously in close proximity to said main arc;

said plasma-arc torch further comprising two elongated electrode holders, one for each of said refractory metal hollow electrode and said auxiliary electrode, each of said electrode holders including a fluid passage for circulating cooling fluid throughout the entire length of each holder, and passage means defined through the length of each holder, for circulating cooling fluid to said nozzle portion for cooling said electrodes, whereby to minimize electrode erosion; and said arrangement further including means for igniting said main arc and said pilot arc while maintaining said pilot arc so that the current value across the pilot arc is at least 0.05 that across the main arc.

2. The plasma-arc torch as set forth in claim 1, wherein the arcing tips of the hollow and auxiliary electrodes are at a distance of 0.1 to 0.5 of the outer diameter of the hollow electrode, as taken on the axis of one of the electrodes, from each other.

3. The plasma-arc torch as set forth in claim 2, wherein the central passage of the hollow electrode between the arcing tips of the hollow and auxiliary electrodes has an expanded portion equal to 0.1 to 0.2 of the outer diameter of the hollow electrode from the arcing tip thereof, and the diameter at the surface of the arcing tip equals to 2 to 5 diameters of the remaining portion of the central passage.

4. The plasma-arc torch as set forth in claim 3, wherein the expanded portion of the central passage of the hollow electrode is a hollow cylinder.

5. The plasma-arc torch as set forth in claim 3, wherein the expanded portion of the central passage of the hollow electrode is a truncated cone.

6. The plasma-arc torch as set forth in claim 1, wherein the auxiliary electrode has a diameter of at least 0.1 of the diameter of the hollow electrode.

* * * * *